United States Patent
Kwa et al.

(10) Patent No.: US 7,801,488 B2
(45) Date of Patent: *Sep. 21, 2010

(54) INTERFERENCE MITIGATION BY ADJUSTMENT OF INTERCONNECT TRANSMISSION CHARACTERISTICS

(75) Inventors: Seh W. Kwa, San Jose, CA (US); David Q. Xu, Fremont, CA (US); Alan E. Waltho, San Jose, CA (US); Andrew W. Martwick, Folsom, CA (US); Ravid Shmuel, Haifa (IL)

(73) Assignee: Intel Corporation, Santa Clara, CA (US)

(*) Notice: Subject to any disclaimer, the term of this patent is extended or adjusted under 35 U.S.C. 154(b) by 752 days.

This patent is subject to a terminal disclaimer.

(21) Appl. No.: 11/706,623

(22) Filed: Feb. 13, 2007

(65) Prior Publication Data

US 2007/0141992 A1 Jun. 21, 2007

Related U.S. Application Data

(63) Continuation of application No. 10/629,967, filed on Jul. 30, 2003, now Pat. No. 7,184,708.

(51) Int. Cl.
*H04B 1/00* (2006.01)
*H04B 15/00* (2006.01)
(52) U.S. Cl. ............... 455/63.1; 455/67.11; 455/67.13; 455/114.2

(58) Field of Classification Search ............ 455/73, 455/63.1, 67.11, 67.13, 550.1, 114.2, 115.1, 455/296
See application file for complete search history.

(56) References Cited

U.S. PATENT DOCUMENTS

| | | |
|---|---|---|
| 6,005,890 A | 12/1999 | Clow et al. |
| 6,453,374 B1 | 9/2002 | Kovalan et al. |
| 6,760,671 B1 * | 7/2004 | Batcher et al. ............... 702/60 |
| 7,184,708 B1 | 2/2007 | Kwa et al. |
| 2002/0141349 A1 | 10/2002 | Kim et al. |
| 2002/0155811 A1 | 10/2002 | Prismantas |
| 2003/0022629 A1 | 1/2003 | Miyoshi |
| 2003/0035491 A1 | 2/2003 | Walton et al. |
| 2003/0045237 A1 | 3/2003 | Gardner et al. |
| 2003/0181211 A1 | 9/2003 | Razavilar et al. |
| 2004/0005885 A1 | 1/2004 | Kato et al. |
| 2004/0053578 A1 | 3/2004 | Grabon et al. |
| 2004/0097251 A1 | 5/2004 | Barilovits |
| 2004/0116123 A1 | 6/2004 | Sundberg et al. |
| 2004/0264396 A1 | 12/2004 | Ginzburg et al. |
| 2005/0250521 A1 | 11/2005 | Joshi et al. |
| 2006/0059213 A1 | 3/2006 | Evoy |

* cited by examiner

*Primary Examiner*—Tuan A Pham
(74) *Attorney, Agent, or Firm*—Grossman, Tucker, Perreault & Pfleger, PLLC

(57) ABSTRACT

Interference within a wireless apparatus is mitigated by adjusting one or more transmission characteristics associated with an interconnect of the apparatus. In at least one embodiment, the interconnect is a PCI Express interconnect.

6 Claims, 7 Drawing Sheets

US 7,801,488 B2

INTERFERENCE MITIGATION BY ADJUSTMENT OF INTERCONNECT TRANSMISSION CHARACTERISTICS

CROSS-REFERENCE TO RELATED APPLICATIONS

This application is a continuation of U.S. application Ser. No. 10/629,967, filed on Jul. 30, 2003 now U.S. Pat. No. 7,184,708.

FIELD OF THE INVENTION

The invention relates generally to interference mitigation and, more particularly, to interference mitigation within a wireless system.

DETAILED DESCRIPTION

Figure 1:
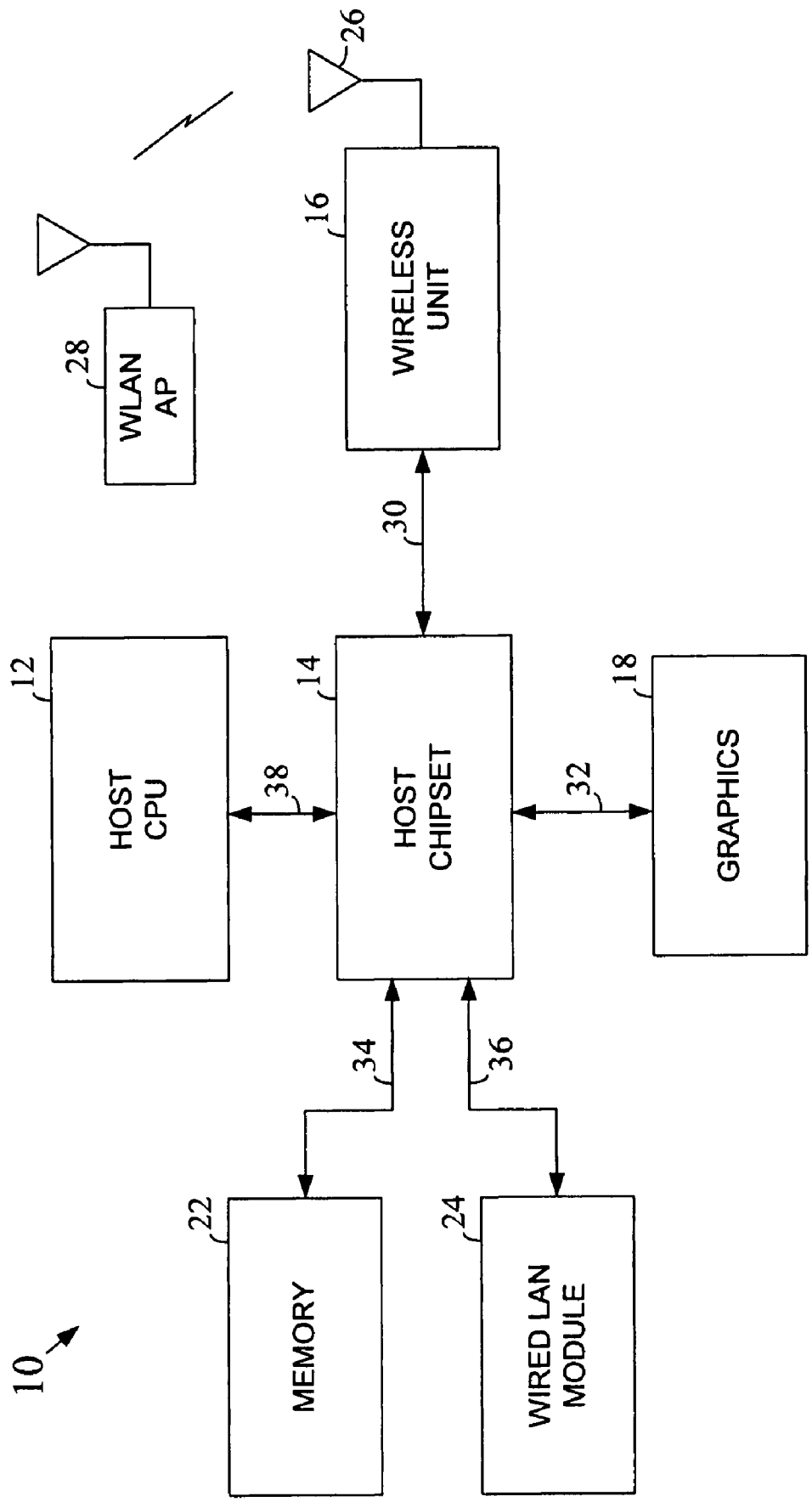
FIG. 1 is a block diagram illustrating an example apparatus having wireless communication capability.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example apparatus 10 having wireless communication capability. The apparatus 10 may be, for example, a desktop, laptop, palmtop, or tablet computer, a personal digital assistant (PDA), a cellular telephone or other form of wireless communicator, a pager, a Bluetooth enabled appliance, and/or any other form of wireless apparatus. As shown, the apparatus 10 may include one or more of a host central processing unit (CPU) 12, a host chipset 14, a wireless unit 16, a graphics unit 18, a memory 22, and a wired local area network (LAN) module 24.

The host CPU 12 is the main processor of the apparatus 10 and may be used to, for example, execute software such as operating system software, application software, and/or others. The host chipset 14 is a device or devices that operates in support of the host CPU 12 and may perform one or more predefined functions for the host such as, for example, data transfer functions, power management functions, and/or others. The graphics unit 18 is operative for controlling the display of information to a user of the apparatus 10. The memory 22 stores digital information for use by the host CPU 12 and possibly for other components within the apparatus 10. The wired LAN module 24 is operative for providing an interface to a wired LAN.

The wireless unit 16 includes circuitry for supporting wireless communication with one or more external entities. In at least one embodiment, the wireless unit 16 is configured to support one or more wireless standards that may include, for example, IEEE 802.11a, b, g; HyperLAN 1, 2; Bluetooth; Ultra Wideband; HomeRF; Wide Band Frequency Hopping; Digital Enhanced Cordless Telephone (DECT); cellular standards (e.g., global system for mobile communication (GSM), personal digital cellular (PDC), code division multiple access (CDMA) (IS-95), CDMAOne, CDMA 2000, advanced mobile phone system (AMPS)), and/or others. The wireless unit 16 may be coupled to an antenna 26 or other transducer to facilitate transmission and/or reception of wireless signals. Any of a variety of different antenna types may be used including a dipole, a monopole, a patch, a helix, and others. As illustrated, in at least one possible arrangement, the wireless unit 16 may communicate with a remote wireless local area network (WLAN) access point (AP) 28. Many alternative arrangements are also possible. It should be appreciated that the architecture and content of the apparatus 10 of FIG. 1 is merely an example of one possible wireless apparatus configuration and is not intended to limit the scope of the invention.

With reference to FIG. 1, the apparatus 10 may include one or more interconnects 30, 32, 34, 36, 38 to provide communication between the various components of the apparatus 10. The interconnects may include point-to-point interconnects, bus structures, and/or any other form of interconnect. As with the speeds of digital processors, the speeds of interconnects within digital systems have been increasing. For example, the nominal speed of the PCI Express interconnect technology is 2.5 Gigabits per second (Gb/s). In conceiving the present invention, it was appreciated that interconnect speeds are rapidly approaching, and some have already reached, a level where they may present a significant source of interference to wireless circuitry within, for example, an apparatus (e.g., wireless unit 16 in FIG. 1). In this regard, methods and structures are provided herein for mitigating such interference through active manipulation of one or more interconnect transmission characteristics.

Figure 2:
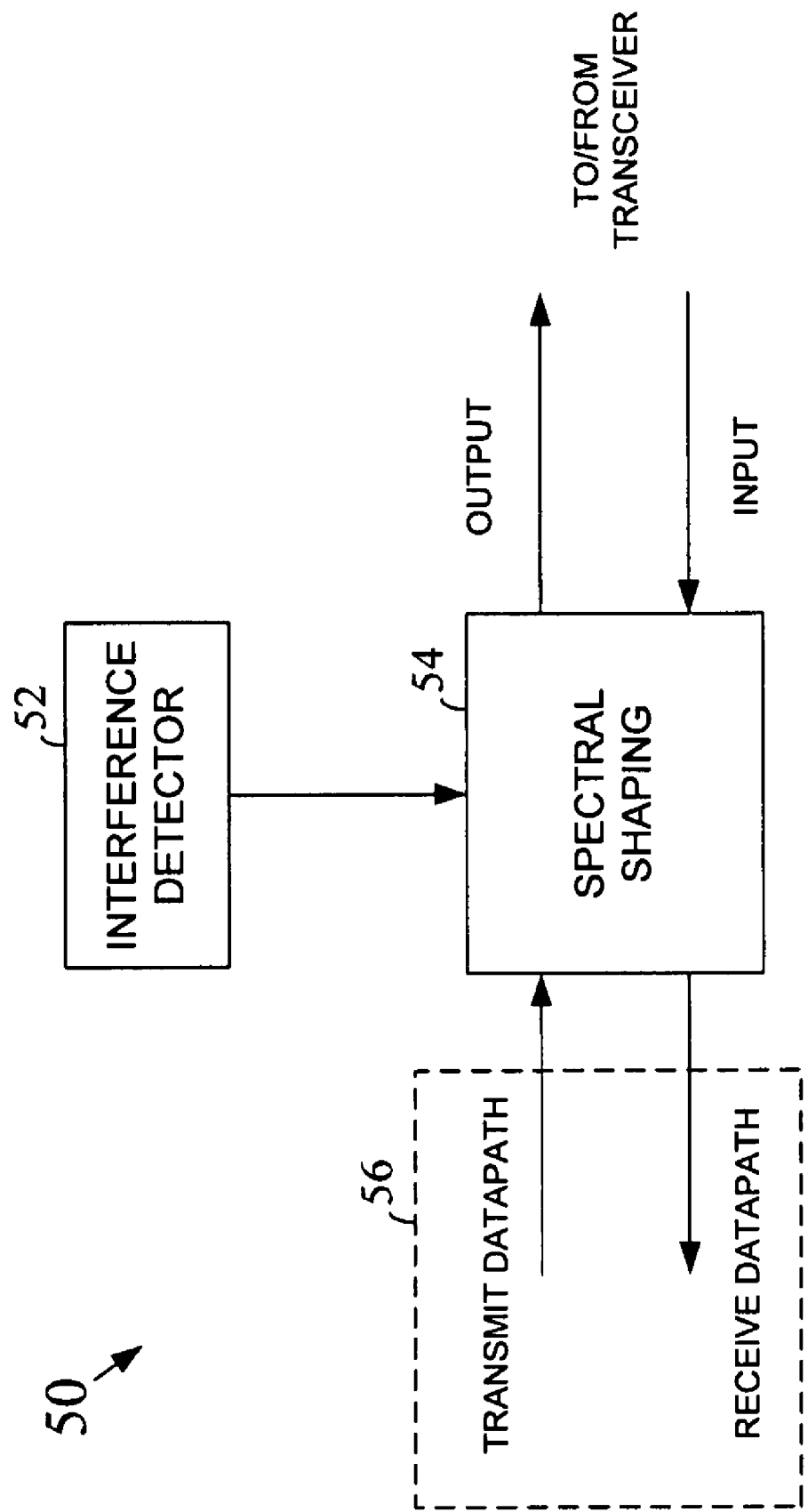
FIG. 2 is a block diagram illustrating an example arrangement for use in mitigating interference in accordance with an embodiment of the present invention.

FIG. 2 is a block diagram illustrating an example arrangement 50 for use in mitigating interference in accordance with an embodiment of the present invention. The arrangement 50 may be implemented within, for example, the apparatus 10 of FIG. 1 or within virtually any other digital apparatus having wireless capability. As illustrated, the arrangement 50 may include one or more of: an interference detector 52, a spectral shaping unit 54, and an interconnect 56.

The interference detector 52 is operative for detecting the presence of interference that may affect or has affected the performance of wireless circuitry (e.g., a wireless transmitter, a wireless receiver, a wireless transceiver, etc.) within an apparatus. When interference of a sufficient level or effect has been detected, the interference detector 52 signals the spectral shaping unit 54 to modify one or more of the transmission characteristics of the interconnect 56 in a manner that may reduce the level of interference within the wireless circuitry. For example, in at least one implementation, the spectral shaping unit 54 changes a data rate associated with the interconnect 56 in response to detection of interference. In another implementation, the spectral shaping unit 54 changes a slew rate associated with the interconnect 56. Other transmission characteristics may alternatively be changed. Multiple different characteristics may also be changed (e.g., data rate and slew rate, etc.). In at least one approach, the goal of the modification made by the spectral shaping unit 54 is to change the spectrum of the interconnect traffic in a manner that reduces the level of spectral energy that falls within an operational frequency range of the wireless circuitry.

The interconnect 56 may be any form of digital interconnect including point-to-point interconnects, bus structures, etc. In the illustrated example embodiment, the interconnect 56 is a PCI Express type interconnect having a separate link for each direction of communication between two components. Other types of interconnect, including interconnects having a single unidirectional or bi-directional link, may also be used. In at least one embodiment, the arrangement 50 is implemented for an interconnect that is coupled directly to wireless circuitry within an apparatus (e.g., interconnect 30 coupled between wireless unit 16 and host chipset 14 in FIG. 1). However, the same or similar arrangement may also (or alternatively) be used in association with one or more other interconnects within an apparatus (e.g., interconnects 32, 34, 36, and/or 38 in FIG. 1).

The interference detector 52 may include any form of device, component, or functionality that is capable of detecting the presence of interference, either through direct or indirect measurement of interference energy or through measurement of one or more wireless performance characteristics that are affected by the presence of interference energy. For example, in at least one approach, the interference detector 52 may include an error rate detector to detect an error rate associated with a wireless receiver (e.g., a bit error rate (BER), a packet error rate, etc.). If the error rate meets a predetermined criterion (e.g., exceeds a threshold value), it may be concluded that interference is present. In at least one implementation, multiple different threshold values are used to detect different levels of interference so that different degrees of interference mitigation may be invoked. In another approach, the interference detector 52 may include a ranging unit to determine a wireless communication range of a corresponding apparatus. If the range meets a predetermined criterion (e.g., is less than a threshold value), it may be concluded that interference is present. In still another approach, the interference detector 52 may include a throughput measurement unit to measure the throughput (peak or average) of a wireless unit. If the measured throughput meets a predetermined criterion (e.g., is less than a threshold value), it may be concluded that interference is present. As will be appreciated, any of a wide variety of other techniques may alternatively be used for determining the presence of interference.

The spectral shaping unit 54 may modify the transmission characteristic(s) of the interconnect 56 in any of a wide variety of ways. In one approach, for example, the spectral shaping unit 54 simply toggles between two (or more) different data rates based on the presence or absence of interference. For example, if a PCI Express interconnect is being used, the spectral shaping unit 54 may operate the interconnect at the standard PCI Express data rate (i.e., 2.5 Gb/s) during normal operation, but change to a reduced data rate (e.g., 833 Mb/s or one-third speed) when interference is detected. The spectral shaping unit 54 may then, for example, change back to the standard data rate after a fixed or variable time interval. Similarly, the spectral shaping unit 54 may change between two or more different transmission characteristic combinations (e.g., from data rate A and slew rate A to data rate B and slew rate B) based on the presence or absence of interference. In another possible approach, the spectral shaping unit 54 may iterate through a number of different transmission characteristic values or value combinations to determine a value or value combination that either minimizes interference or reduces interference to an acceptable level.

In at least one implementation, a number of different wireless standards are supported within a single apparatus. As is well known, different wireless standards may have different operational frequency ranges from one another and, therefore, may be affected differently by interference having a particular frequency. In accordance with at least one embodiment of the invention, one or more new transmission characteristic values are selected for an interconnect, when interference has been detected, based on a wireless application that is presently being implemented. For example, when an apparatus is being operated in accordance with IEEE 802.11a and interference is detected, a data rate is selected that is known to cause reduced interference with IEEE 802.11a and when the apparatus is being operated in accordance with IEEE 802.11b and interference is detected, a data rate is selected that is known to cause reduced interference with IEEE 802.11b, and so on. A lookup table approach may be used to select one or more appropriate values based on the current application. Alternatively, the selection may be made algorithmically or in some other fashion. After the data rate (or other transmission characteristic) has been changed, it may be changed back to a standard value after a fixed or variable time period.

Referring to FIG. 2, although the spectral shaping unit 54 is illustrated as being directly coupled to the interconnect 56 with which it is operating, it should be appreciated that this functionality is not limited to such a location. That is, the spectral shaping functionality may be located in any of a variety of locations within an apparatus or may be divided amongst multiple locations. In one approach, for example, the spectral shaping functionality is part of the interconnect engine. In another approach, it is implemented within the wireless circuitry (e.g., as part of a wireless protocol, etc.). In yet another approach, the spectral shaping functionality is loaded as a software driver during, for example, installation of a wireless network card or other wireless module. Other locations may also be used. The interference detection functionality may also be implemented in any of a variety of locations within an apparatus. The spectral shaping functionality and the interference detection functionality may be implemented in a variety of different ways, including software, hardware, firmware, and hybrid implementations.

Figure 3:
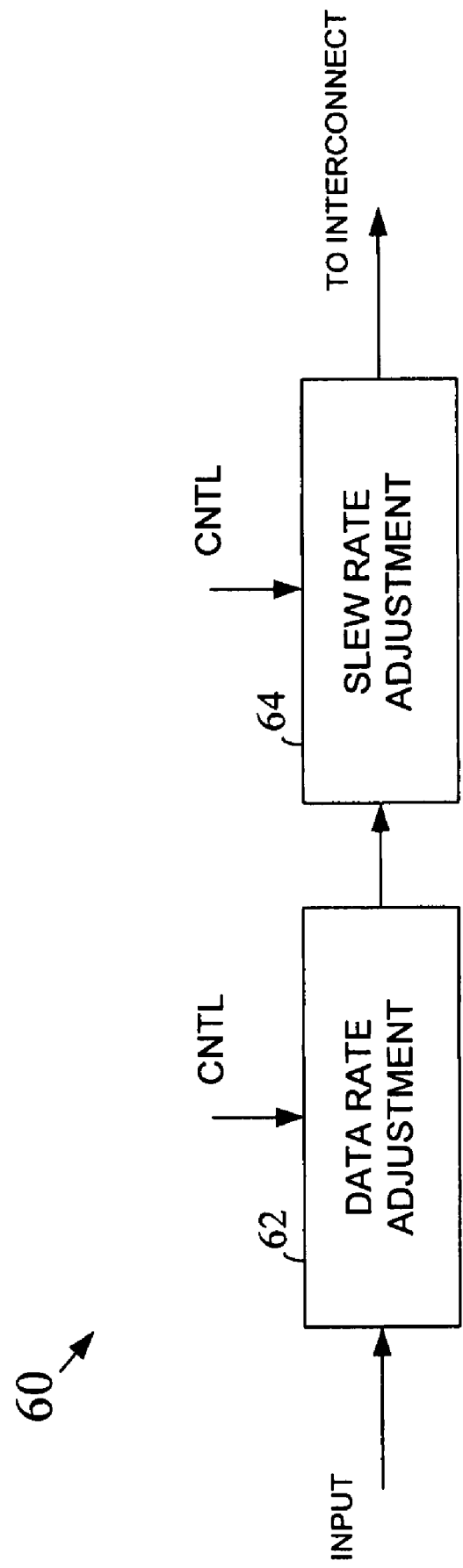
FIG. 3 is a block diagram illustrating example spectral shaping equipment that may be used to perform spectral shaping for an interconnect in accordance with an embodiment of the present invention.

FIG. 3 is a block diagram illustrating example spectral shaping equipment 60 that may be used to perform spectral shaping for an interconnect in accordance with an embodiment of the present invention. The equipment 60 may, for example, form part of the spectral shaping unit 54 of FIG. 2. As shown, the spectral shaping equipment 60 includes a data rate adjustment unit 62 and a slew rate adjustment unit 64.

The data rate adjustment unit 62 is operative for adjusting the data rate of a data stream before it reaches an interconnect, in response to control information. Likewise, the slew rate adjustment unit 64 is operative for adjusting the slew rate of the data stream before the stream reaches the interconnect, in response to control information. In other embodiments, only a data rate adjustment unit or only a slew rate adjustment unit is used. Other types of adjustments may alternatively be made. The spectral shaping functionality may be part of an encoder unit for encoding a data stream for delivery to the interconnect. A corresponding decoder may also be used at the other end of the interconnect. Similar functionality may also be provided to support communication in an opposite direction.

Figure 4:
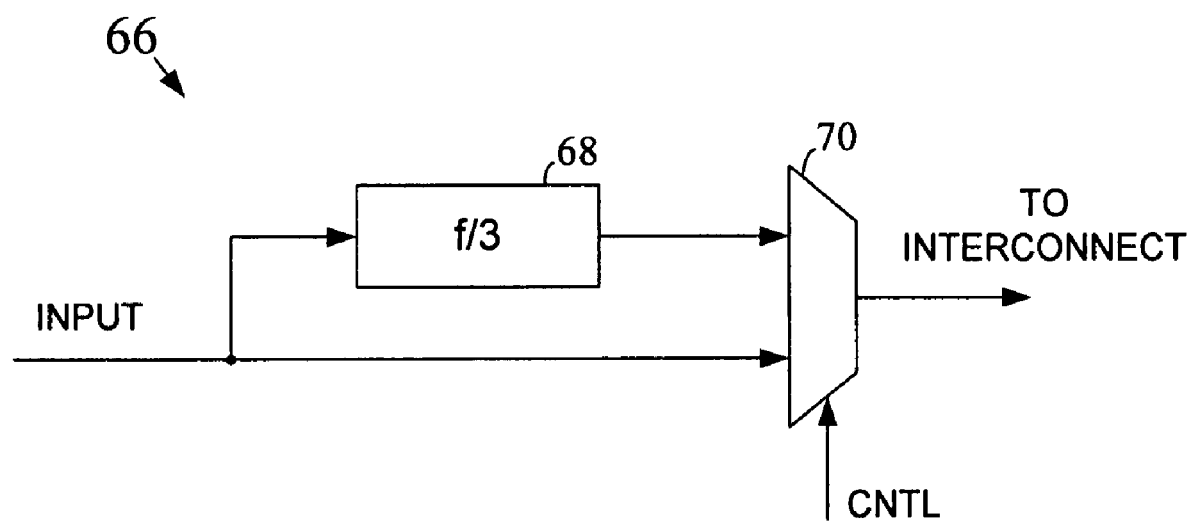
FIG. 4 is a block diagram illustrating an example data rate adjustment unit in accordance with an embodiment of the present invention.

FIG. 4 is a block diagram illustrating an example data rate adjustment unit 66 in accordance with an embodiment of the present invention. As shown, the data rate adjustment unit 66 includes a divide-by-three unit 68 and a multiplexer 70. An input data stream is applied to both an input of the divide-by-three unit 68 and an input of the multiplexer 70. The output of the divide-by-three unit 68 is coupled to the other input of the multiplexer 70. During normal operation, the multiplexer 70 may be instructed to allow the input data stream to flow through to the interconnect. When interference has been detected, however, the multiplexer 70 may be instructed to allow the output of the divide-by-three unit 68 to flow through to the interconnect. After a fixed or variable time period, or in response to some other stimuli, the multiplexer 70 may switch back to its original state. As will be appreciated, a wide variety of alternative architectures are possible for the data rate adjustment unit in accordance with the present invention.

Figure 5:
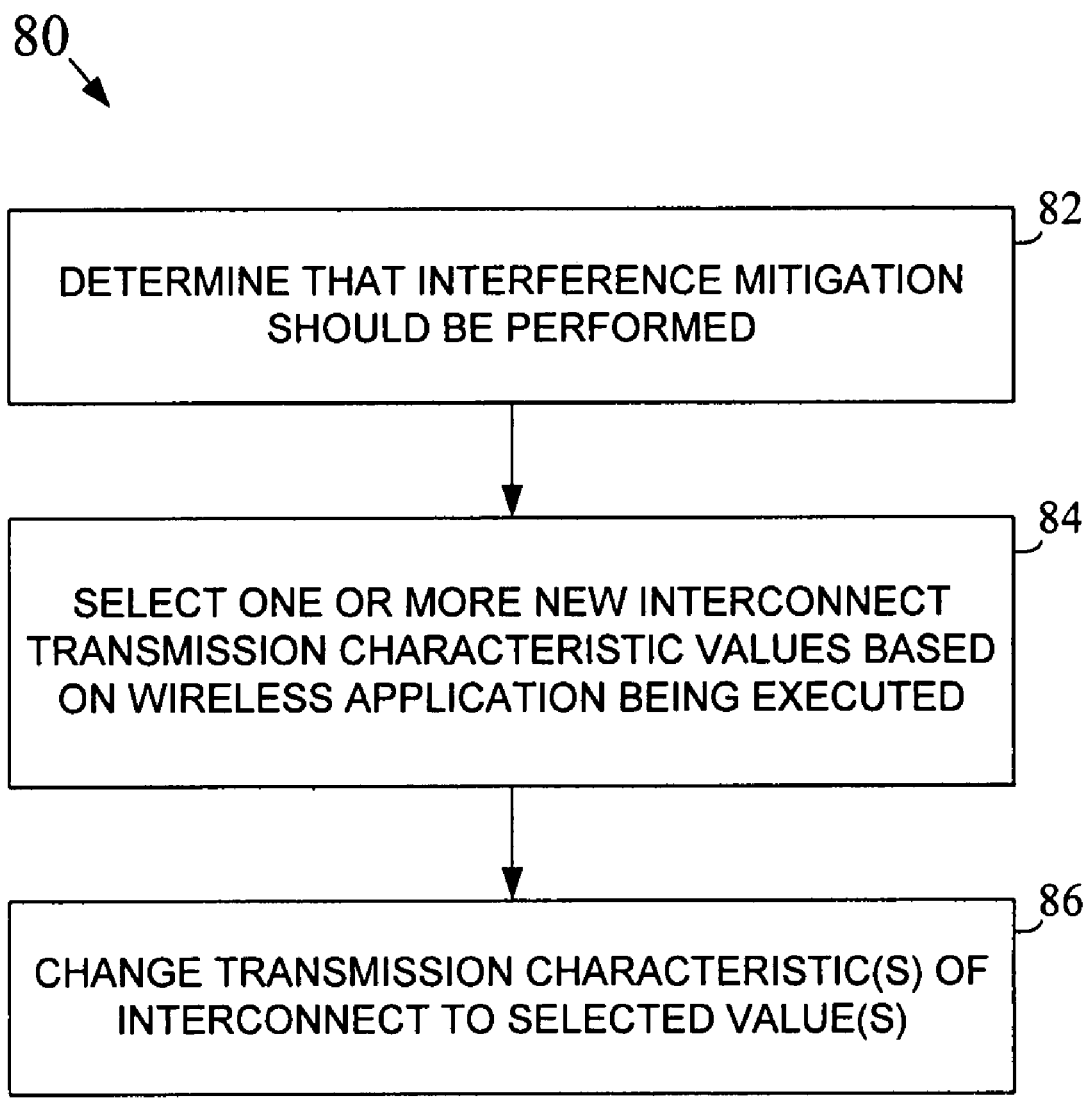
FIG. 5 is a flowchart illustrating an example method for mitigating interference in a wireless apparatus in accordance with an embodiment of the present invention.

FIG. 5 is a flowchart illustrating an example method 80 for mitigating interference in a wireless apparatus in accordance with an embodiment of the present invention. First, a determination is made that interference mitigation should be performed (block 82). Such a determination may be made, for example, by directly or indirectly measuring potential interference energy within an apparatus or by measuring a performance characteristic of wireless circuitry and determining that it is not within a desired range. Other determination techniques are also possible. After a determination has been made, one or more new interconnect transmission characteristic values are selected for the interconnect based on a wireless application that is presently being implemented (block 84). For example, in one approach, a first data rate may be selected if a first wireless standard (e.g., IEEE 802.11a) is being implemented, a second data rate may be selected if a second wireless standard (e.g., IEEE 802.11b) is being implemented, and so on. Other selection techniques are also possible. The transmission characteristic(s) of the interconnect is(are) then changed to the selected value(s) for use in providing communication over the interconnect (block 86).

Figure 6:
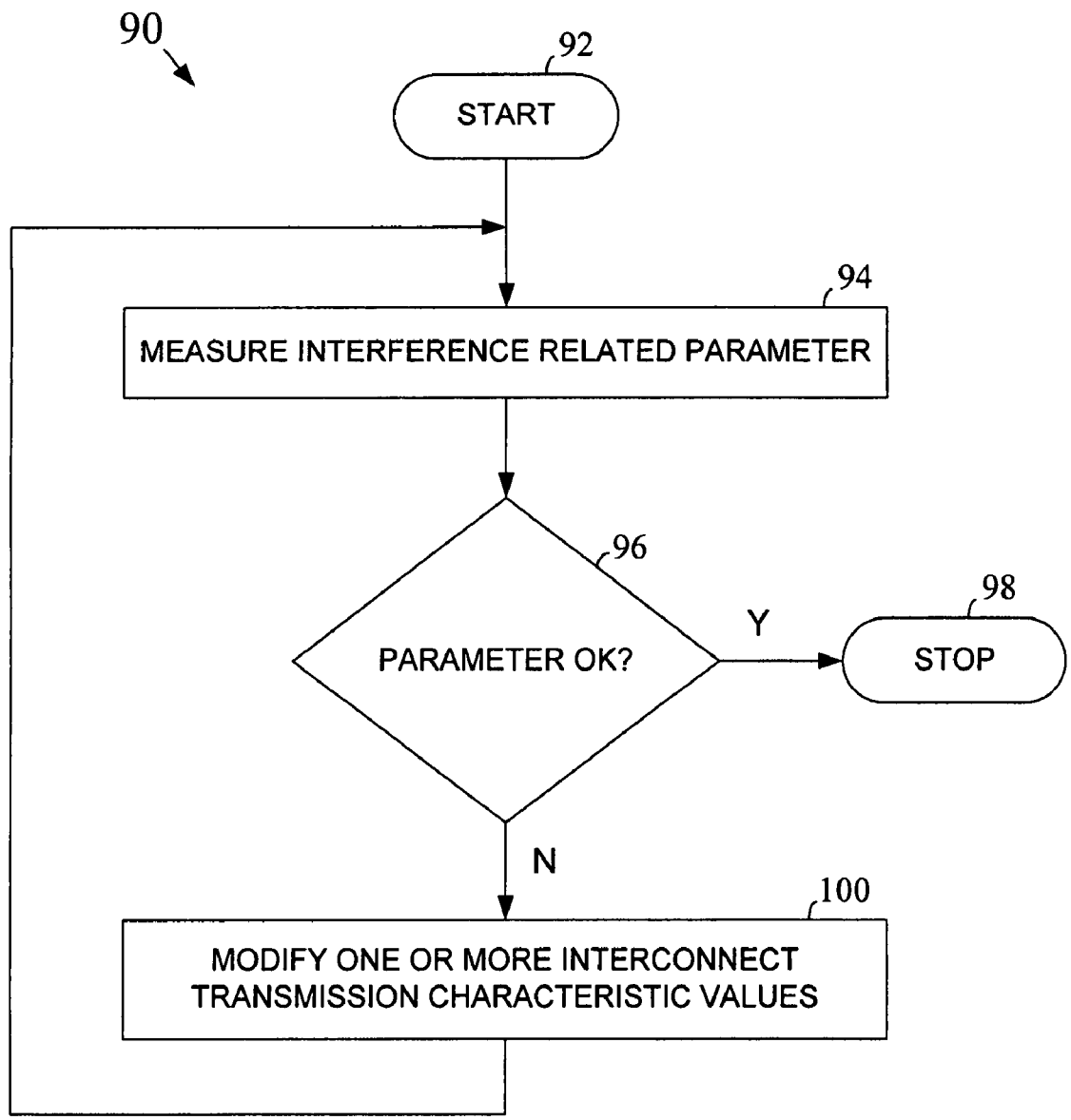
FIG. 6 is a flowchart illustrating an example method for mitigating interference in a wireless apparatus in accordance with an embodiment of the present invention.

FIG. 6 is a flowchart illustrating an example method 90 for mitigating interference in a wireless apparatus in accordance with an embodiment of the present invention. The method 90 utilizes an iterative approach to determine transmission characteristics for an interconnect that will provide an enhanced level of interference mitigation. After the method 90 is initiated (block 92), an interference-related parameter is measured (block 94). The interference-related parameter may include, for example, a bit-error rate (BER), a wireless communication range, an interference signal level, or any other parameter that is related to interference. It is next determined whether the measured interference-related parameter value is acceptable (block 96).

For example, if the interference-related parameter is a BER, it may be determined whether the measured BER is less than a threshold value. If the interference-related parameter is a wireless communication range, it may be determined whether the measured range is above a threshold value. If the interference-related parameter is an interference signal level, it may be determined whether the measured level is below a threshold value, and so on. If the measured parameter value is acceptable, the method may be terminated (block 98). If the measured parameter value is not acceptable, one or more interconnect transmission characteristic values may be modified (block 100).

The method 90 then returns to block 94 and the interference-related parameter is again measured. The cycle may be repeated until the measured interference-related parameter value is acceptable. In a similar iterative method, an interference-related parameter is measured for each of a finite number of interconnect transmission characteristic values or combinations of values. A value or combination of values is then selected that results in the best measured interference-related parameter value. Other similar iterative interference mitigation techniques are also possible.

As described above, in at least one embodiment of the invention, the inventive principles are used in connection with a PCI Express interconnect. In a PCI Express environment, a variety of different techniques may be used to adjust the data rate of an interconnect in accordance with the invention. In one possible approach, for example, a PCI Express training sequence is used to modify a data rate of an interconnect when interference has been detected. The training sequence is a series of ones and zeros that are delivered between two components at opposite ends of a PCI Express link to establish synchronization between the components. For example, a wireless module may be coupled to a host chipset through a PCI Express link. To establish synchronization, the host chipset will send a training sequence to the wireless module and the wireless module will send a training sequence to the host chipset. Each training sequence includes a number of bits (i.e., the data rate identifier) that may be used to encode the data rate that the PCI Express link supports. Currently, the PCI Express protocol uses only one of these bits (i.e., bit #1) to indicate a rate of 2.5 Gb/s (the standard PCI Express data rate). In accordance with the present invention, the other bits may be used so that the components at either end of a PCI Express link may indicate to one another the operating frequencies that they each support. This allows a component to determine a data rate that the PCI Express link may be changed to when interference mitigation is desired.

Figure 7:
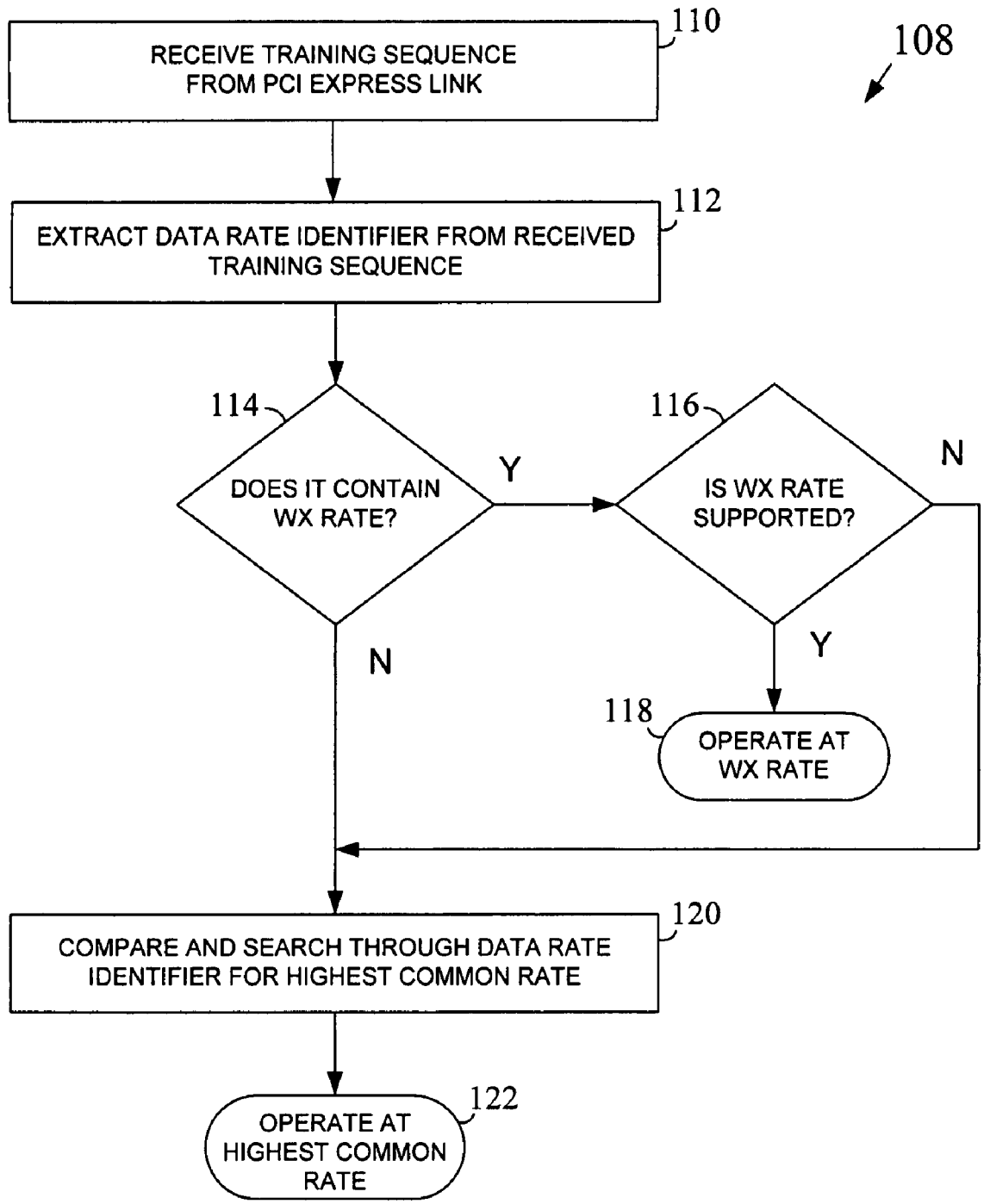
FIG. 7 is a flowchart illustrating an example method for negotiating a new data rate for a PCI Express or similar type interconnect when interference mitigation is desired in accordance with an embodiment of the present invention.

FIG. 7 is a flowchart illustrating an example method 108 for negotiating a new data rate for a PCI Express or similar type interconnect when interference mitigation is desired. A training sequence is first received by a component from a PCI Express link (block 110). As described above, the training sequence will typically have originated within a component at the other end of the link (e.g., with reference to FIG. 1, the wireless unit 16 may receive a training sequence from the host chipset 14 via interconnect 30). After the training sequence has been received, a data rate identifier is extracted from the sequence (block 112). It is then determined whether the identifier contains a wireless extension (WX) data rate (currently 833 Mb/s or one-third the standard PCI Express rate) (block 114). If the identifier does include the WX rate, it is next determined whether the rate is supported by the component (block 116). If the rate is supported, the PCI Express link is operated at the WX rate (block 118). If the WX rate is not supported, or if the identifier does not include the WX rate, the data rate identifier is searched and compared to the rates supported by the component to determine the highest rate common to both the identifier and the component (block 120).

The PCI Express link is then operated at the highest common rate (block 122). As will be appreciated, many alternative techniques for negotiating a new data rate on a PCI Express interconnect also exist.

In another possible approach for adjusting the data rate (or other transmission characteristic(s)) of a PCI Express interconnect, the PCI Express message protocol may be used. After synchronization has been achieved between two components coupled to a PCI Express link, the components will be able to exchange meaningful data with one another. In accordance with at least one embodiment of the invention, a handshaking message may be used to effect a change in one or more transmission characteristics of the PCI Express link (e.g., data rate, slew rate, data rate and slew rate, etc.). For example, if a wireless module is communicating with a host chipset (or other component) through a PCI Express link, the wireless module may deliver a message to the chipset that indicates that the wireless module wants to change to a different data rate. The chipset may then respond to the wireless module in either a positive or negative manner. If the chipset responds positively, the data rate of the link may be changed immediately. If the chipset responds negatively, the wireless module may send another request for a different data rate. This may continue until a data rate is agreed upon. A wide variety of other message based handshaking protocols may alternatively be used.

In still another technique for adjusting the data rate of a PCI Express interconnect, a configuration bit approach is used. That is, one component coupled to a PCI Express link may indicate a desire to change the data rate of the link by forcing a bit within a register to a logic high (or logic low) value. Another component coupled to the link may then check its capability and respond either negatively or positively by, for example, changing the bit back to its original value or leaving it alone. Other configuration bit response techniques are also possible. It should be appreciated that the techniques described above for negotiating a change of data rate and/or other transmission characteristics of a PCI Express interconnect are merely examples of some possible techniques that may be used to implement the inventive principles and that many other alternative techniques also exist.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An apparatus comprising:
a wireless transceiver;
an interconnect coupling at least a first component and a second component; and a controller to:
  determine whether interference mitigation should be performed to reduce interference generated by said interconnect that is affecting operation of said wireless transceiver; and
  change a data rate of said interconnect from a first rate to a second rate in response to a determination that interference mitigation should be performed and change said data rate from said second rate back to said first rate a predetermined time period later.

2. The apparatus of claim 1, further comprising:
an input node to carry a first data signal having a first frequency;
a frequency divider coupled to said input node to generate a second data signal having a frequency that is a fraction of said first frequency;
a multiplexer having a first input coupled to said input node and a second input coupled to an output of said frequency divider to controllably connect either said first data signal or said second data signal to said interconnect in response to a control signal from said controller.

3. The apparatus of claim 1, further comprising:
at least one dipole antenna coupled to said wireless transceiver.

4. The apparatus of claim 1, wherein:
said controller also adjusts a slew rate of said interconnect in response to said determination.

5. The apparatus of claim 1, wherein:
said controller determines that interference mitigation should be performed based on a wireless application presently being executed.

6. The apparatus of claim 1, wherein:
said controller determines that interference mitigation should be performed based on detection of interference energy that exceeds a predetermined level.

* * * * *